United States Patent [19]

Steinberg

[11] Patent Number: 5,245,645
[45] Date of Patent: Sep. 14, 1993

[54] STRUCTURAL PART FOR A NUCLEAR REACTOR FUEL ASSEMBLY AND METHOD FOR PRODUCING THIS STRUCTURAL PART

[75] Inventor: Eckard Steinberg, Erlangen, Fed. Rep. of Germany

[73] Assignee: Siemens Aktiengesellschaft, Munich, Fed. Rep. of Germany

[21] Appl. No.: 839,629

[22] Filed: Feb. 21, 1992

Related U.S. Application Data

[63] Continuation-in-part of Ser. No. 745,904, Aug. 16, 1991, abandoned.

[30] Foreign Application Priority Data

Jan. 27, 1992 [EP] European Pat. Off. ......... 92101295.1

[51] Int. Cl.$^5$ ............................................. G21C 3/06
[52] U.S. Cl. ..................................... 376/457; 376/416
[58] Field of Search ................. 376/457, 416, 414; 420/422; 148/11.5 R, 328, 405; 976/DIG. 44, DIG. 53

[56] References Cited

U.S. PATENT DOCUMENTS

| | | | |
|---|---|---|---|
| 3,287,111 | 11/1966 | Klepfer | 75/177 |
| 4,584,030 | 4/1986 | McDonald et al. | 148/11.5 F |
| 4,728,491 | 3/1988 | Reschke et al. | 376/457 |
| 4,751,045 | 6/1988 | Foster et al. | 376/457 |
| 4,908,071 | 3/1990 | Anderson et al. | 148/11.5 F |
| 5,122,334 | 6/1992 | Bradley | 376/457 |
| 5,125,985 | 6/1992 | Foster et al. | 148/672 |

FOREIGN PATENT DOCUMENTS

| | | |
|---|---|---|
| 0085553 | 8/1983 | European Pat. Off. . |
| 0171675 | 2/1986 | European Pat. Off. . |
| 0196286 | 10/1986 | European Pat. Off. . |
| 0405172 | 1/1991 | European Pat. Off. . |
| 1327734 | 10/1961 | France . |
| 2509510 | 1/1983 | France . |

Primary Examiner—Donald P. Walsh
Assistant Examiner—Meena Chelliah
Attorney, Agent, or Firm—Herbert L. Lerner; Laurence A. Greenberg

[57] ABSTRACT

A structural part for a nuclear reactor fuel assembly includes a zirconium alloy material having at least one alloy ingredient selected from the group consisting of oxygen and silicon, a tin alloy ingredient, at least one alloy ingredient selected from the group consisting of iron, chromium and nickel, and a remainder of zirconium and unavoidable contaminants. The zirconium alloy material has a content of the oxygen in a range of substantially from 700 to 2000 ppm, a content of the silicon of substantially up to 150 ppm, a content of the iron in a range of substantially from 0.07 to 0.5% by weight, a content of the chromium in a range of substantially from 0.05 to 0.35% by weight, a content of the nickel of substantially up to 0.1% by weight, and a content of the tin in a range of substantially from 0.8 to 1.7% by weight. The alloy ingredients selected from the group consisting of iron, chromium and nickel are precipitated out of a matrix of the zirconium alloy as secondary phases, having a diameter with a geometric mean value in a range of substantially from 0.1 to 0.3 $\mu$m. The degree of recrystallization of the zirconium alloy is less than or equal to 10% and a sample of the zirconium alloy, after a recrystallization annealing with a degree of recrystallization of 97±2%, has a mean grain diameter less than or equal to 3 $\mu$m.

13 Claims, 3 Drawing Sheets

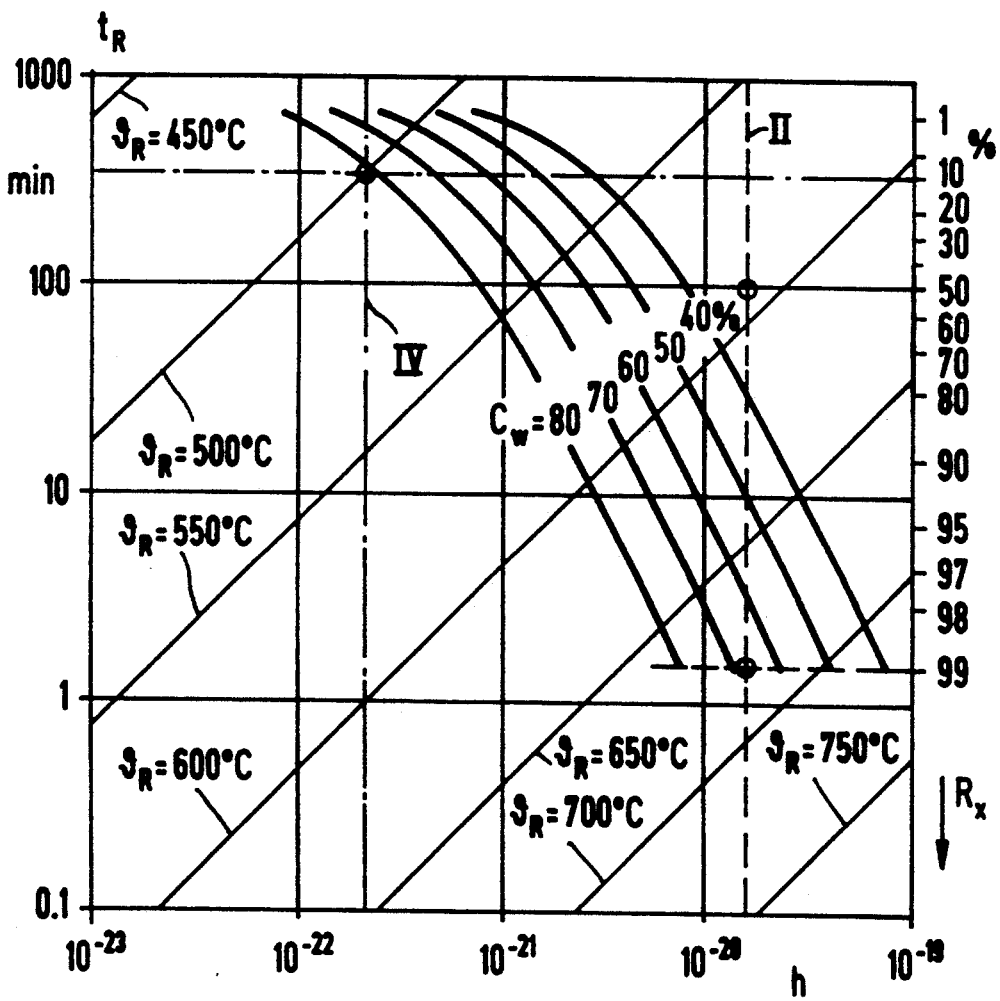
FIG 3    $A = t_R \cdot \exp{-Q/RT}$

STRUCTURAL PART FOR A NUCLEAR REACTOR FUEL ASSEMBLY AND METHOD FOR PRODUCING THIS STRUCTURAL PART

CROSS-REFERENCE TO RELATED APPLICATIONS

This application is a continuation-in-part of application Ser. No. 745,904, filed Aug. 16, 1991, abandoned on Dec. 11, 1992.

The invention relates to a structural part for a nuclear reactor fuel assembly, in particular a cladding or casing tube for a nuclear fuel-filled fuel rod or a spacer for such fuel rods, and to a method for producing the structural part.

German Published, Non-Prosecuted Application DE-OS 34 28 954 discloses a cladding or casing tube made of a zirconium alloy for a nuclear reactor fuel rod that can be filled with nuclear fuel. The zirconium alloy may be Zircaloy-2, containing from 1.2 to 1.7% by weight tin, 0.07 to 0.2% by weight iron, 0.05 to 0.15% by weight chromium, 0.03 to 0.08% by weight nickel, 0.07 to 0.15% by weight oxygen, and zirconium for the remainder. The geometric mean value of the grain diameter of the zirconium alloy is less than or equal to 3 $\mu$m. In particular, the geometric mean value is from 2.5 to 2 $\mu$m.

Such a cladding tube is supposed to possess great resistance to stress corrosion cracking. Stress corrosion cracking is a corrosion mechanism on the inside of the cladding or casing tube in the nuclear reactor, for which the expansion of the cladding or casing tube resulting from the swelling of the nuclear fuel filling it and from nuclear fission products such as iodine liberated from the nuclear fuel are responsible. Stress corrosion cracking plays a particular role in nuclear reactor fuel rods that are used in boiling water reactors. There, abrupt changes in power of the nuclear reactor, in particular, can cause breaching of the cladding or casing tube walls of the nuclear reactor fuel rods from stress corrosion cracking. The grain diameter in a zirconium alloy can be determined by A.S.T.M. (American Society for Testing Materials) designation E 112-61. The geometric mean value of n diameters is defined as $X^G = (d_1 \cdot d_2 \ldots d_i \cdot d_n)^{1/n}$, where $d_i$ is the $i^{th}$ diameter.

It is accordingly an object of the invention to provide a structural part for a nuclear reactor fuel assembly and a method for producing this structural part, which overcome the hereinafore-mentioned disadvantages of the heretofore-known methods and devices of this general type, and which include a zirconium alloy that has a high corrosion resistance not only to the nuclear fuel or nuclear fission products but also to the coolant which is water in a nuclear reactor, even at relatively high prevailing temperatures, for instance in a pressurized water reactor, which is higher than in a boiling water reactor.

With the foregoing and other objects in view there is provided, in accordance with the invention, a structural part being formed of a cladding or casing tube of a nuclear fuel-filled fuel rod or a spacer for a fuel rod for a nuclear reactor fuel assembly, comprising:

a) a zirconium alloy material having at least one alloy ingredient selected from the group consisting of oxygen and silicon, a tin alloy ingredient, at least one alloy ingredient selected from the group consisting of iron, chromium and nickel, and a remainder of zirconium and unavoidable contaminants;

b) the zirconium alloy material having a content of the oxygen in a range of substantially from 700 to 2000 ppm, a content of the silicon of substantially up to 150 ppm, a content of the iron in a range of substantially from 0.07 to 0.5% by weight, a content of the chromium in a range of substantially from 0.05 to 0.35% by weight, a content of the nickel of substantially up to 0.1% by weight, and a content of the tin in a range of substantially from 0.8 to 1.7% by weight;

c) the alloy ingredients selected from the group consisting of iron, chromium and nickel being precipitated out of a matrix of the zirconium alloy as secondary phases, having a diameter with a geometric mean value in a range of substantially from 0.1 to 0.3 $\mu$m; and d) the degree of recrystallization of the zirconium alloy being less than or equal to 10% and a sample of the zirconium alloy, after a recrystallization annealing with a degree of recrystallization of 97±2%, having a grain size with a geometric mean value less than or substantially equal to 3 $\mu$m.

In accordance with another feature of the invention, the content of iron in accordance with characteristic (b) is in a range of substantially from 0.07 to 0.3% by weight, and the content of chromium is in a range of substantially from 0.05 to 0.15% by weight, in the zirconium alloy.

The diameter of secondary phases, that is independent crystallites of alloy components precipitated out of the zirconium alloy, can be determined either with high accuracy by using a transmission electron microscope, or with an accuracy which is not as high by using a scanning electron microscope. The geometric mean value of these diameters is defined in correspondence with the definition of the geometric diameter of particle or grain diameters.

The degree of recrystallization is defined as the percentage of recrystallized crystal matrix in the zirconium alloy.

The relatively low content of tin in the zirconium alloy in accordance with characteristic (b) mentioned above and the relatively high geometric mean value of the diameter of the secondary phases precipitated out of the matrix of the zirconium alloy in accordance with characteristic (c), in particular, bring about the increased corrosion resistance with respect to water.

In accordance with a further feature of the invention, the zirconium alloy has a texture with a Kearns parameter $f_r$ wherein $0.6 \leq f_r \leq 1$ and preferably $0.6 \leq f_r \leq 0.8$. An even further increased corrosion resistance to both nuclear fuel or nuclear fission products and to water at increased temperatures can be attained in this way.

A body of a zirconium alloy has a texture, if the hexagonal crystallites of this body have a 3-dimensional ordered alignment (for instance attainable by mechanical deformation), as compared with a purely random alignment (for instance virtually attainable by $\beta$-quenching).

One measure for the alignment of the crystallites which form right angles with the surface of the body being formed of the zirconium alloy and thus for the texture, is the Kearns parameter $f_r$, which can be calculated in accordance with "Metallurgical Transactions A", Volume 10A, April 1979, pages 483 through 487. The necessary measurements are carried out in a goniometer with the aid of directional X-radiation.

In accordance with an added feature of the invention, the content of tin in the zirconium alloy is in a range of substantially from 0.9 to 1.1 % by weight.

In accordance with an additional feature of the invention, the contents of the alloy ingredients iron and chromium in the zirconium alloy are in a ratio of substantially 2:1, and/or the contents of the alloy ingredients iron and chromium have a sum of substantially 0.4 to 0.6% by weight.

In this way, the structural parts being formed of the zirconium alloy can be given an optimal corrosion resistance to water at elevated temperatures.

In accordance with yet another feature of the invention, the contents of the alloy ingredients iron and chromium have a sum of substantially 0.4 % by weight.

In accordance with yet a further feature of the invention, in accordance with characteristic (b), the content of oxygen is in a range of substantially from 1000 to 1800 ppm, the content of silicon is in a range of substantially from 80 to 120 ppm, the content of iron is in a range of substantially from 0.35 to 0.45% by weight, the content of chromium is in a range of substantially from 0.2 to 0.3% by weight, and the content of tin is in a range of substantially from 1 to 1.2% by weight.

In accordance with yet an added feature of the invention, the zirconium alloy is Zircaloy-2 or Zircaloy-4.

With the objects of the invention in view, there is also provided a method for producing a structural part, which comprises:

a) annealing a starting body of a zirconium alloy at a temperature in the $\beta$ range below the melting temperature to dissolve precipitated-out alloy ingredients, then quenching the starting body at a quenching rate of at least 30 K/s at a surface of the starting body, at a temperature transition through the $\alpha+\beta$ range;

b) then annealing the starting body at a first temperature in the $\alpha$ range until formation of precipitates of the alloy ingredients having a precipitate diameter with a geometric mean value in a range of substantially from 0.1 to 0.3 μm;

c) hot-forging the starting body into a forged part at a second temperature in the $\alpha$ range below the first temperature;

d) then hot-rolling or hot-extruding the forged part at a temperature in the $\alpha$ range below the first temperature; and e) then cold-rolling the hot-rolled forged part in at least two rolling steps having recrystallization annealing carried out between two rolling steps with a degree of recrystallization in a range of substantially from 95% to 99% at an annealing temperature in the $\alpha$ range, while cold-pilgering the hot-extruded forged part in at least two pilgering steps, with a recrystallization annealing carried out between two pilgering steps with a degree of recrystallization in a range of substantially from 95% to 99% at an annealing temperature in the $\alpha$ range.

With the objects of the invention in view, there is additionally provided a method for producing a structural part, which comprises:

a) annealing a starting body of a zirconium alloy at a temperature in the $\beta$ range below the melting temperature to dissolve precipitated-out alloy ingredients, then quenching the starting body at a quenching rate of at least 30 K/s at a surface of the starting body, at a temperature transition through the $\alpha+\beta$ range;

b) hot-forging the starting body into a forged part at a first temperature in the $\alpha$ range;

c) then heating the forged part to a second temperature in the $\alpha$ range above the first temperature, until formation of precipitations of the alloy ingredients having a precipitation diameter with a the geometric mean value in a range of substantially from 0.1 to 0.3 μm;

d) then hot-rolling or hot-extruding the forged part at a temperature in the $\alpha$ range below the second temperature; and e) then cold-rolling the hot-rolled forged part in at least two rolling steps having recrystallization annealing carried out between two rolling steps with a degree of recrystallization in a range of substantially from 95% to 99% at an annealing temperature in the $\alpha$ range, while the hot-extruded forged part is cold-pilgered in at least two pilgering steps, with a recrystallization annealing carried out between two pilgering steps with a degree of recrystallization in a range of substantially from 95% to 99%, at an annealing temperature in the $\alpha$ range In accordance with another mode of the invention, there is provided a method which comprises performing a final pilgering step and pilgering steps preceding the final pilgering step in the at least two pilgering steps, selecting a logarithmic cold work of at least 1.0 in the pilgering steps preceding the final pilgering step, and selecting a logarithmic cold work of at least 1.6 in the final pilgering step.

In accordance with a further mode of the invention, there is provided a method which comprises performing a final pilgering step and pilgering steps preceding the final pilgering step in the at least two pilgering steps, selecting a quotient of a logarithmic wall thickness variation to a logarithmic diameter variation of at least 1 in the pilgering steps preceding the final pilgering step, and selecting a quotient of a logarithmic wall thickness variation to a logarithmic diameter variation of at least 5 in the final pilgering step.

In accordance with a concomitant mode of the invention, there is provided a method which comprises performing a final rolling step and a final pilgering step, performing a final annealing following the final rolling step or the final pilgering step, and performing the final stress relief annealing with a degree of recrystallization of a maximum of 10%.

The logarithmic wall thickness variation $\epsilon_S$ is the natural logarithm of the quotient $S_o/S$ of the wall thickness of a tube before ($S_o$) and after (S) a pilgering step. The logarithmic diameter variation $\epsilon_D$ is the natural logarithm of the quotient $D_o/D$ of the mean diameter (between the inside and outside diameter) of this tube before ($D_o$) and after (D) the same pilgering step. The logarithmic cold work value $\phi$ of the tube effected by this pilgering step is defined as $\phi=\epsilon_S+\epsilon_D$, and a cold-deformation $C_W$ associated with the pilgering step is $C_W=100 (1-\exp-\phi)$ in percent.

The $\alpha$ range of a zirconium alloy is the temperature range in which the crystal of the zirconium alloy has a hexagonal structure. The $\beta$ range is the temperature range in which the crystal of the zirconium alloy has a cubically body-centered structure. The $(\alpha+\beta)$ range is the temperature transition range in which both of these crystal structures are present in the zirconium alloy.

Other features which are considered as characteristic for the invention are set forth in the appended claims.

Although the invention is illustrated and described herein as embodied in the manufacture of two cladding tubes for a nuclear reactor fuel assembly, for instance for a UO$_2$-filled fuel rod in a fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 3 is a diagram illustrating a relationship between cold-deformation, annealing temperature and annealing time and the resulting degree of recrystallization.

The invention and its advantages will be described in further detail below with respect to the production of two embodiments of a cladding or casing tube for a fuel rod filled with nuclear fuel such as UO$_2$, for a nuclear reactor fuel assembly.

Figure 1:
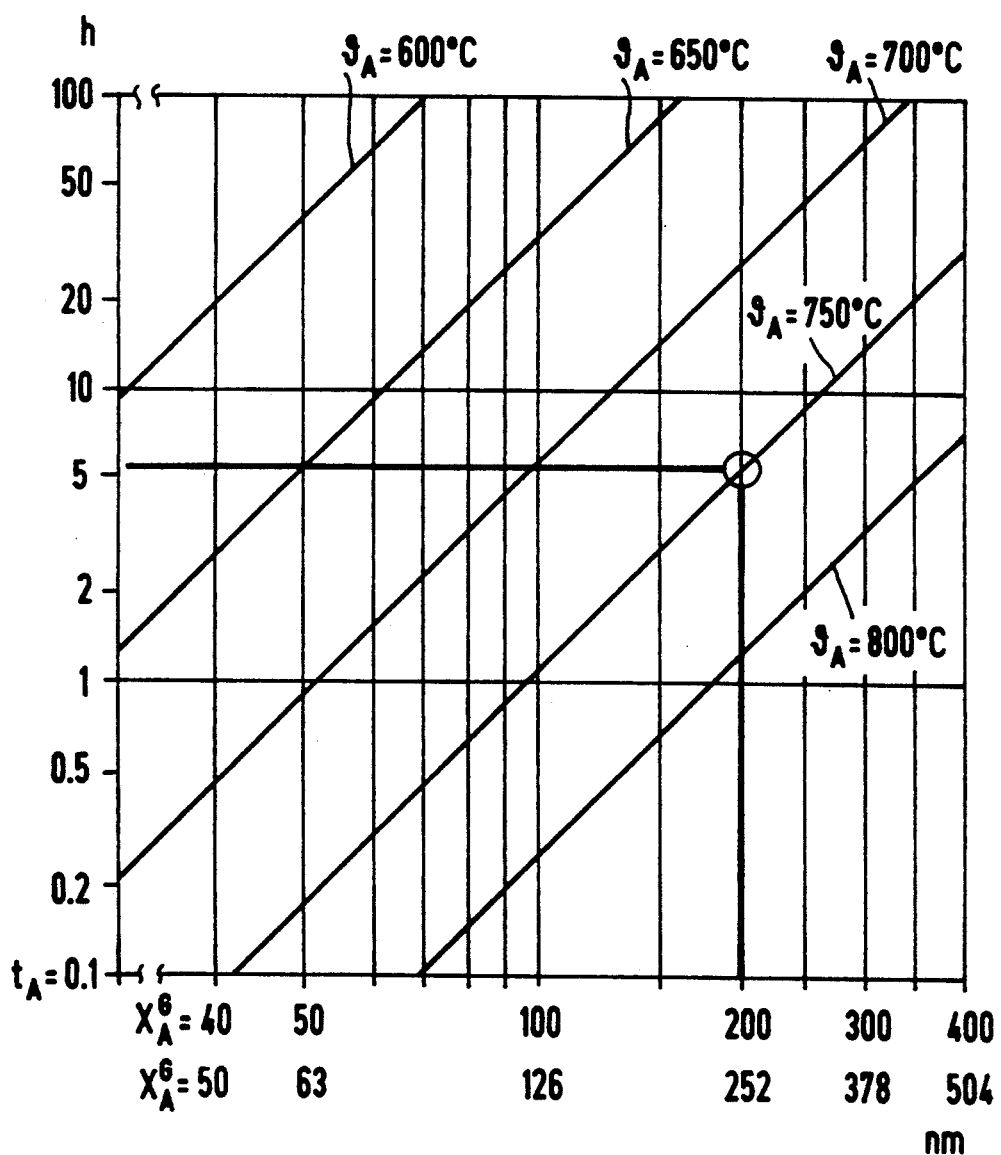
FIG. 1 is a diagram illustrating a relationship of annealing conditions and size of second phase particles.

Referring first to FIG. 1 in particular, there is seen a diagram which shows the relationship between an annealing temperature $\phi_A$ and an annealing time $t_A$ and a resultant geometric mean value $X_G^A$ of the diameter of deposits precipitated out of alloy components after the annealing of a first zirconium alloy Zircaloy-4 (1.2 to 1.7 % by weight tin, 0.18 to 0.24% by weight iron, 0.07 to 0.13% by weight chromium, 0.10 to 0.16% by weight oxygen, up to 120 ppm silicon, with the remainder zirconium and unavoidable contaminants; and the sum in % by weight of iron and chromium: 0.28 to 0.37% by weight) and a second zirconium alloy with the alloy ingredients being 1 to 1.2 % by weight tin, 0.35 to 0.45% by weight iron, 0.2 to 0.3% by weight chromium, 0.1 to 0.18% by weight oxygen, and 80 to 120 ppm silicon, with the remainder zirconium and unavoidable contaminants.

In the diagram of FIG. 1, the equation below applies to the geometric mean value $X_A^G$ of the diameters of the precipitates of alloy ingredients i.e. components or alloying elements, in the applicable zirconium alloy:

$$X_A^G = X_{A\,min}^G + \Delta X_A^G \cdot \frac{1}{1 + \dfrac{1}{k_1 \cdot t_A^n \cdot \exp - Q/RT}}$$

In the diagram of FIG. 1, the upper scale in the abscissa applies to the first zirconium alloy (Zircaloy-4), and the lower abscissa scale applies to the second zirconium alloy.

The above equation was obtained empirically for the two zirconium alloys by determining the geometric mean values of the diameters of precipitated of alloy ingredients in test bodies, in each case involving these two zirconium alloys. These test bodies were first heated to a temperature of 1150° C. and then quenched with water. After this β-quenching, the majority of the alloy ingredients, iron and chrome, have precipitated out in finely-dispersed form. A geometric mean value of the diameters of the precipitates in the test bodies was found to be $X_G^A$ min=20 nm. The various test bodies were then exposed to various annealing temperatures for variously long annealing times. After they had cooled down, the geometric mean values of the diameters of the precipitates were determined for each test body. This geometric mean value became higher, as the annealing temperature became higher or the annealing time for the applicable test body became longer. However, this geometric mean value is limited at the top by the relatively small quantity of the iron and chrome alloy ingredients in the applicable test bodies. This limitation is taken into account for the first zirconium alloy by a constant $\Delta X_A^G = 1000$ nm, and for the second zirconium alloy by a constant $\Delta X_A^G = 1260$ nm in the above-given equation. In this equation, the following symbols have the following meanings: $k_1 = 0.47 \times 10^{-7}$ per hour, n=0.57; the activation temperature Q/R=18,240K (R=general gas constant) and, T=$\phi_A$+273 K.

Figure 2:
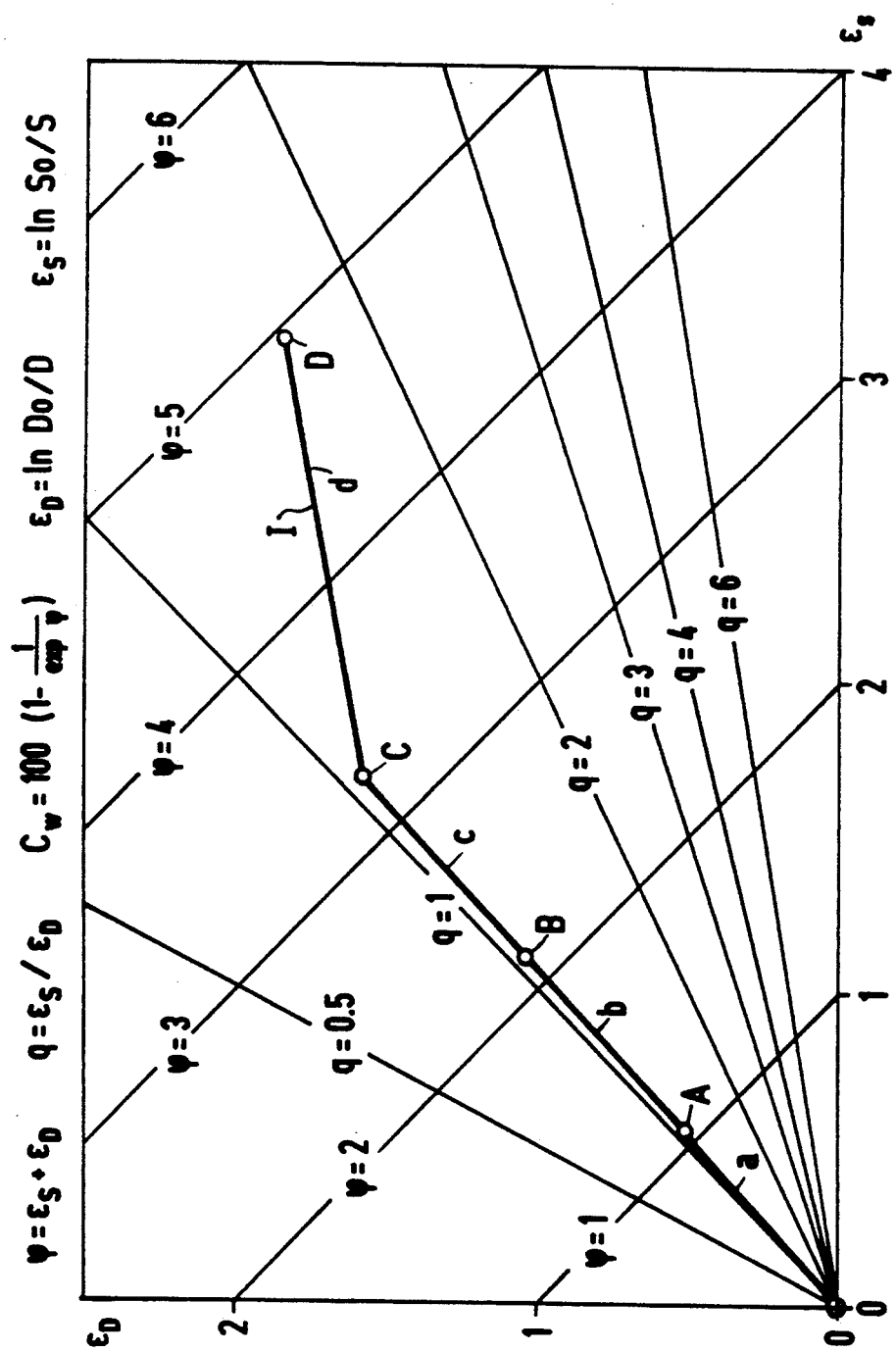
FIG. 2 is a diagram showing a relationship between a variation in diameter, wall thickness and logarithmic cold work.

The diagram in FIG. 2 shows the relationship between a logarithmic variation $\epsilon_D$ in diameter, a logarithmic variation $\epsilon_S$ in wall thickness, a logarithmic cold work $\phi$, and a quotient $q = \epsilon_S/\epsilon_D$ when a tube is produced by pilgering. The following equations apply:

$$\epsilon_S = \frac{\phi}{1 + \dfrac{1}{q}}$$

$$\epsilon_D = \frac{\phi}{1 + q}$$

The diagram of FIG. 3 shows the relationship between cold-deformation $C_W$, an annealing temperature $\phi_R$ and an annealing time $t_R$, and a resultant degree of recrystallization $R_x$ after the annealing of the Zircaloy-4 tube cold-deformed by pilgering. The degree of recrystallization $R_x$ is the proportion in percentage of the crystal structure recrystallized after annealing. The empirically obtained equations below apply to the degree of recrystallization $R_x$:

$$\sqrt{\frac{R_x}{1 - R_x}} = k_2 \cdot \phi^2 \cdot t_R \cdot \exp - Q/RT = k_2 \cdot \phi^2 \cdot A$$

where the annealing temperature $A = t_R \cdot \exp - Q/RT$, with the constant $k_2 = 8.3 \times 10^{18}$ min$^{-1}$, and the activation temperature Q/R =40,000K (R=general gas constant), and T=$\phi_R$+273K (see "Zirconium in the Nuclear Industry"; A.S.T.M. Special Technical Publication 824; 1984; pages 106 through 122).

A first solid cylindrical blank or tubular body of Zircaloy-4 has the alloy composition 1.2% by weight tin, 0.24% by weight iron, 0.12% by weight chromium, 0.15% by weight oxygen, 0.01% by weight silicon, and the remainder zirconium with technically unavoidable contaminants, and a second solid cylindrical blank or tubular body has the alloy composition 1.1% by weight tin, 0.4% by weight iron, 0.25% by weight chromium, 0.14% by weight oxygen, 100 ppm silicon and the remainder zirconium with technically unavoidable contaminants. In the case of both of these zirconium alloys, the α range extends to approximately 810° C., the (α+β) mixed range extends from approximately 810° to 940° C., and the B range begins at approximately 940° C. The diameter of the blank or tubular body is 600 mm.

Both blanks or tubular bodies are heated to a temperature in the β range of 1150° C. At this temperature, each of the two solid cylindrical blanks or tubular bodies is forged into a solid cylindrical starting body having a diameter of 350 mm.

Next, the two starting bodies are again heated to a temperature in the β range of 1150° C., until such time as precipitated alloy components have dissolved. Then each starting body is quenched in water at a quenching rate of 35 K/s at the surface of the starting body during temperature passage through the (α+β) range, in other words through the temperature range from 940° to 810° C. Finally, both starting bodies are left to cool to a temperature of approximately 100° C. on the body surface.

Then both starting bodies are annealed at a temperature in the α range, to form precipitates of the iron and chromium alloy components as secondary phases. The annealing temperature selected is 750° C. for both starting bodies. As can be seen from the diagram of FIG. 1, the associated annealing time for forming the desired precipitates is 5 hours. In the alloy of the first starting body, precipitates of the alloy components iron and chromium form as secondary phases having a geometric mean value of 0.2 μm, and in the alloy of the second starting body they form with a geometric mean value of 0.252 μm.

Next, the two starting bodies are hot-forged to a diameter of 150 mm at a temperature of 700° C., which is in the α range. This hot-forging at 700° C. can also be performed before the development of the precipitates of the alloy components in the starting body.

After cooling to room temperature, a continuous hole which is 50 mm in diameter is drilled in the axial direction into each of the two cylindrical forged parts produced, forming a hollow cylinder. The hollow cylinders are reheated to a temperature in the α range of 700° C. and hot-extruded with a cylinder press. The applicable hollow cylinder is pressed by a cylindrical die with an internal mandrel, producing a tube with an unchanged inside diameter of 50 mm and an outside diameter of 80 mm.

Both tubes obtained by extrusion are then placed in a pilgering machine and pilgered in four pilgering steps to a finished tube having an inside diameter of 9.30 mm, an outside diameter of 10.75 mm, and thus a wall thickness of 0.72 mm. A pilgering machine is described in U.S. Pat. No. 4,233,834.

In the diagram of FIG. 2, a pilgering path I associated with these four pilgering steps is shown with pilgering steps a from 0 to A, b from A to B, c from B to C, and d from C to D. A logarithmic cold work per pilgering step, for the first three pilgering steps a, b, c, is approximately $\phi_a = \phi_b = \phi_c = 1.1$ each time, which is equivalent to a cold-deformation $C_{Wa}$ and $C_{Wb}$ and $C_{Wc}$ of approximately 67% per pilgering step a or b or c. In the last pilgering step d, the logarithmic cold work $\phi_d = 1.65$, which is equivalent to a cold-deformation $C_{Wd}$ of 81% as a result of this pilgering step d.

The ratio $q_a = q_b = q_c$ for the first three pilgering steps a, b and c, is approximately 1.1 each, and for the fourth and last pilgering step d, $q_d$ = approximately 5.5.

Between each two pilgering steps, recrystallization annealing is carried out virtually without secondary recrystallization. The degree of recrystallization $R_x$ is 99%, for example.

In the case of this degree of recrystallization, the result is good deformability of the tube for the ensuing pilgering step.

Through the use of the diagram of FIG. 3, the annealing parameters A represented by the straight line II can be found for a cold-deformation $C_W$ of 67% and a degree of recrystallization $R_x$ at 99%. The intersections of the straight line II with the annealing isotherms define the annealing temperature $\phi_R$ and the associated annealing time $t_R$, which are necessary to avoid secondary recrystallization in the recrystallization annealings between the pilgering steps. For instance, an annealing temperature of 590° C. and an annealing time of 100 minutes, in a Zircaloy-4 tube having a cold-deformation of 67%, lead to a degree of recrystallization of 99%. The diagram of FIG. 3 is practically equally applicable to a tube made from the zirconium alloy of the second blank or tubular body.

After the last pilgering step, both of the tubes are stress relieved in a final annealing. The result is a degree of recrystallization of at most 10%. In the diagram corresponding to FIG. 3, the maximum annealing parameter A for a cold-deformation of 81% and a degree of recrystallization $R_x$ of a maximum of 10% can be seen. The intersections of the straight line IV with the annealing isotherms define the annealing temperature $\phi_R$ and the associated annealing time $t_R$ for a suitable final annealing. For instance, an annealing temperature of 500° C. and an associated annealing time of 400 minutes leads to the degree of recrystallization $R_x = 10\%$.

The two finished tubes thus obtained have a texture having the Kearns parameter of 0.63, which is determined substantially by the selection of the ratio $q_d$ for the fourth and last pilgering step d. Moreover, the geometric mean value of the diameter of the alloy components iron and chrome precipitated out of the matrix of the first zirconium alloy as second phases is practically unchanged at 0.2 μm, and in the second zirconium alloy is also practically unchanged at 0.252 μm.

A material test sample is taken from each of the finished tubes. Both material samples are annealed for two minutes at a temperature of 660° C. The zirconium alloy of the two test samples is found to have a degree of recrystallization of 99% and the geometric mean value of the grain size of the matrix is 2.8 μm for both zirconium alloys.

Both finished tubes are used as nuclear fuel-filled cladding or casing tubes of fuel rods and have such high corrosion resistance that they obtain a service life of 4 years in a pressurized water reactor without becoming damaged, while a service life of only 3 years is obtainable with typical tubes of Zircaloy-4.

I claim:

1. A structural part for a nuclear reactor fuel assembly, comprising:
    a) a zirconium alloy material having at least one alloy ingredient selected from the group consisting of oxygen and silicon, a tin alloy ingredient, at least one alloy ingredient selected from the group consisting of iron, chromium and nickel, and a remainder of zirconium and unavoidable contaminants;
    b) the zirconium alloy material having a content of the oxygen in a range of substantially from 700 to 2000 ppm, a content of the silicon of substantially up to 150 ppm, a content of the iron in a range of substantially from 0.07 to 0.5% by weight, a content of the chromium in a range of substantially from 0.05 to 0.35% by weight, a content of the nickel of substantially up to 0.1% by weight, and a content of the tin in a range of substantially from 0.8 to 1.7% by weight;
    c) the alloy ingredients selected from the group consisting of iron, chromium and nickel being precipitated out of a matrix of the zirconium alloy as secondary phases, having a diameter with a geometric mean value in a range of substantially from 0.1 to 0.3 μm; and
    d) a degree of recristallization of the zirconium alloy being less than or equal to 10% and a sample of the zirconium alloy, after a recristallization annealing with a degree of recrystallization of the sample of zirconium alloy of 97±2%, having a grain size with a geometric mean value less than or substantially equal to 3 μm.

2. The structural part according to claim 1, wherein the content of iron is in a range of substantially from 0.07 to 0.3% by weight, and the content of chromium is in a range of substantially from 0.05 to 0.15% by weight, in said zirconium alloy.

3. The structural part according to claim 1, wherein said zirconium alloy has a texture with a Kearns parameter $f_r$ wherein $0.6 \leq f_r \leq 1$.

4. The structural part according to claim 1, wherein said zirconium alloy has a texture with a Kearns parameter $f_r$ wherein $0.6 \leq f_r \leq 0.8$.

5. The structural part according to claim 1, wherein the content of tin in said zirconium alloy is in a range of substantially from 0.9 to 1.1% by weight.

6. The structural part according to claim 1, wherein the contents of said alloy ingredients iron and chromium in said zirconium alloy are in a ratio of substantially 2:1.

7. The structural part according to claim 1, wherein the contents of said alloy ingredients iron and chromium in said zirconium alloy are in a ratio of substantially 2:1, and the contents of said alloy ingredients iron and chromium have a sum of substantially 0.4 to 0.6 % by weight.

8. The structural part according to claim 1, wherein contents of said alloy ingredients iron and chromium have a sum of substantially 0.4 to 0.6% by weight.

9. The structural part according to claim 6, wherein the contents of said alloy ingredients iron and chromium have a sum of substantially 0.4% by weight.

10. The structural part according to claim 1, wherein the content of oxygen is in a range of substantially from 1000 to 1800 ppm, the content of silicon is in a range of substantially from 80 to 120 ppm, the content of iron is in a range of substantially from 0.35 to 0.45% by weight, the content of chromium is in a range of substantially from 0.2 to 0.3 % by weight, and the content of tin is in a range of substantially from 1 to 1.2% by weight.

11. The structural part according to claim 2, wherein said zirconium alloy is Zircaloy-2.

12. The structural part according to claim 2, wherein said zirconium alloy is Zircaloy-4.

13. A structural part formed of a casing tube of a nuclear fuel-filled fuel rod or a spacer for a fuel rod of a nuclear reactor fuel assembly, comprising:

a) a zirconium alloy material having at least one alloy ingredient selected from the group consisting of oxygen and silicon, a tin alloy ingredient, at least one alloy ingredient selected from the group consisting of iron, chromium and nickel, and a remainder of zirconium and unavoidable contaminants;

b) the zirconium alloy material having a content of the oxygen in a range of substantially from 700 to 2000 ppm, a content of the silicon of substantially up to 150 ppm, a content of the iron in a range of substantially from 0.07 to 0.5% by weight, a content of the chromium in a range of substantially from 0.05 to 0.35% by weight, a content of the nickel of substantially up to 0.1% by weight, and a content of the tin in a range of substantially from 0.8 to 1.7% by weight;

c) the alloy ingredients selected from the group consisting of iron, chromium and nickel being precipitated out of a matrix of the zirconium alloy as secondary phases, having a diameter with a geometric mean value in a range of substantially from 0.1 to 3 $\mu$m; and d) a degree of recrystallization of the zirconium alloy being less than or equal to 10 % and a sample of the zirconium alloy, after a recrystallization annealing with a degree of recrystallization of 97±2%, having a grain size with a geometric mean value less than or substantially equal to 3 $\mu$m.

* * * * *